(12) United States Patent
King

(10) Patent No.: US 8,262,061 B2
(45) Date of Patent: Sep. 11, 2012

(54) BALL VALVE

(76) Inventor: Robert W. King, Santa Clarita, CA (US)

( * ) Notice: Subject to any disclaimer, the term of this patent is extended or adjusted under 35 U.S.C. 154(b) by 308 days.

(21) Appl. No.: 12/777,700

(22) Filed: May 11, 2010

(65) Prior Publication Data

US 2011/0278487 A1     Nov. 17, 2011

(51) Int. Cl.
*F16K 25/00* (2006.01)
(52) U.S. Cl. .............. 251/192; 251/251; 251/315.16
(58) Field of Classification Search .......... 251/192, 251/188, 315.16, 251, 314
See application file for complete search history.

(56) References Cited

U.S. PATENT DOCUMENTS

| | | | | |
|---|---|---|---|---|
| 2,277,975 A | * | 3/1942 | Heggem ............ | 251/163 |
| 3,124,333 A | * | 3/1964 | Sivyer ............ | 251/161 |
| 4,940,210 A | * | 7/1990 | Gilmore ............ | 251/160 |
| 5,265,845 A | * | 11/1993 | Gilliam ............ | 251/163 |
| 5,308,039 A | * | 5/1994 | King ............ | 251/192 |
| 7,651,071 B1 | * | 1/2010 | Tanner et al. ........ | 251/174 |

* cited by examiner

Primary Examiner — John K Fristoe, Jr.
Assistant Examiner — Umashankar Venkatesan
(74) Attorney, Agent, or Firm — Paul Y. Feng; The Eclipse Group LLP

(57) ABSTRACT

A ball valve having a cam element, and a ball having a left arm and a right arm with a slot between each arm. A terminal portion of each arm is positioned adjacent the cam element. The cam element is shaped so that, when the ball is rotated from the open condition to the closed condition, the cam element forces the arms through three distances of separation. A first distance, when the ball has undergone no rotation from the fully open condition. A second distance, when the ball has undergone some rotation from the fully open condition towards the closed condition but has not reached the closed condition. A third distance in which the ball has undergone rotation to the closed condition. The third distance is greater than the first distance, and the second distance is greater than the third distance.

19 Claims, 7 Drawing Sheets

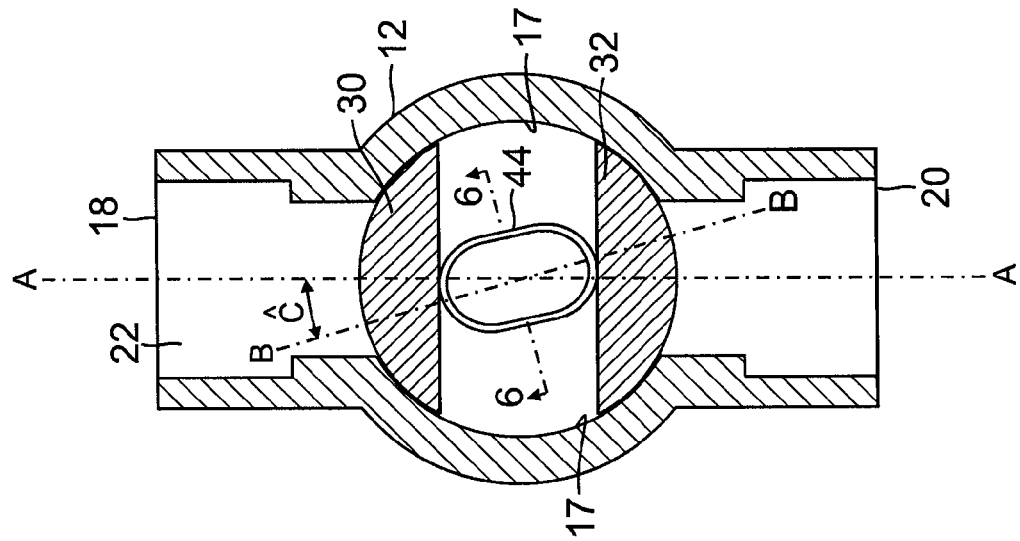
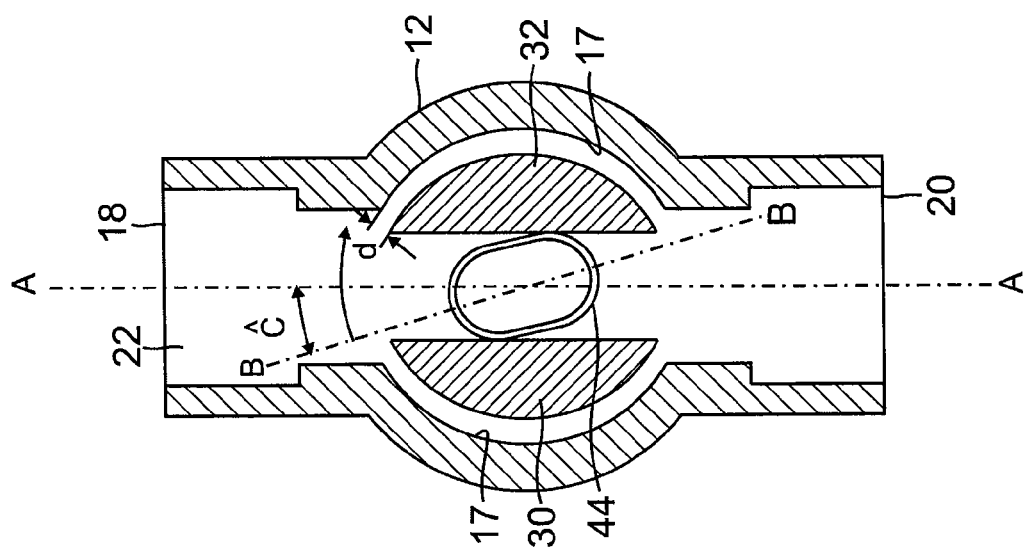

… … …

BALL VALVE

BACKGROUND

The present invention relates to valves for regulating fluid flow.

Ball valves are known in the art, and have traditionally been used as an effective mechanism for regulating fluid flow in conduits. They are commonly found in plumbing for the home, recreational vehicles, mobile homes, garden, or general landscaping. Various structural arrangements have been achieved for interrupting fluid flow by twisting a handle of a ball valve, and resuming fluid flow by twisting the handle back again. Typically, ball valves include a housing having an inlet port and an outlet port. A throughbore internally connects the inlet port to the outlet port. An inlet conduit and an outlet conduit may be connected to the inlet port and the outlet port respectively. A central chamber is positioned in the path of the throughbore. A ball with a throughbore is positioned within the central chamber. The ball may be rotated by an external handle. When the handle is twisted to align the throughbore of the ball with the path of the throughbore, the throughbore is uninterrupted and fluid may flow between the inlet and outlet ports. When the handle is twisted so that the slot lies perpendicular to the throughbore, fluid flow is interrupted.

In a particular aspect of the prior art, found in U.S. Pat. No. 5,308,039 (King) which is concurrently owned by the applicant, the ball may be caused to "expand" as it is rotated towards the closed position. This expansion is caused by a camming surface strategically positioned to expand the ball upon rotation of the ball. In this prior art, the camming surface is symmetrical about an axis that extends parallel with the axis of the throughbore and the surface causes the ball to continually expand as the handle is turned from its open position to its closed position. Thus, as the ball is twisted toward the closed position, the force required to close the valve steadily increases until the ball has reached its fully closed position. This aspect of the prior art is more fully discussed below with reference to FIGS. 3 and 7.

However, disadvantages are found to exist in the prior art. First, it has been found that water pressure in the conduit line is capable of cracking the seal between the ball and the chamber, causing the ball to start rotating toward the open position. The possibility of this disadvantageous outcome may be exacerbated if a vibration is imposed on the closed valve, which would tend to reduce the frictional resistance that otherwise restrains the ball from moving away from its closed position. Second, it has been found that the presence of salt or sediment deposits in the valve housing and/or on the ball surface may tend to obstruct the ball from reaching its fully closed position.

Thus, there is a need for a ball valve that overcomes the above. The present invention addresses these and other needs.

SUMMARY OF THE INVENTION

A preferred embodiment of the invention comprises a ball valve including a housing configured to define an inlet port, an outlet port, and a throughbore linking the inlet port to the outlet port. A chamber having a spherical inner profile is positioned in the throughbore. A cam element is positioned on a floor of the chamber. A ball is positioned in the chamber, and is configured to be rotatable in the chamber from a fully open condition to a closed condition sealing off fluid flow through the throughbore. The ball has a left arm and a right arm and a slot between each arm. Under this configuration, a terminal portion of each arm is positioned adjacent the cam element so that the cam element is positioned in the slot.

The cam element is shaped so that, when the ball is rotated from the open condition to the closed condition, the cam element forces the arms through three distances of separation from each other, namely: a first distance of separation in which the arms are spaced a first distance from each other, when the ball has undergone no rotation from the fully open condition; a second distance of separation in which the arms are spaced a second distance from each other, when the ball has undergone some rotation from the fully open condition towards the closed condition but has not reached the closed condition; and, a third distance of separation in which the arms are spaced a third distance from each other, and in which the ball has undergone rotation to the closed condition. The third distance is greater than the first distance, and the second distance is greater than the third distance. Under this configuration, force or torque required to move the ball from the open condition to the closed condition reduces over the last few degrees of rotation towards the closed condition. By corollary, the force required to move the ball from the closed condition towards the open condition requires an increasing force for the first few degrees of rotation. Preferably, the angle of rotation over which such an increasing force occurs is between about 10 and 20 degrees, and most preferably about 15 degrees. This feature has the advantageous effect of tending to prevent the ball from accidentally opening from the closed condition. Preferably, the difference between the second distance and the third distance is not less than 15% of the difference between the second distance and the first distance.

In a further aspect of the invention, the cam element has an oval shape. Further preferably, the cam element has a shape that is symmetrical about a line which is offset from an axis linking the inlet port with the outlet port.

In another facet, the invention is a ball valve comprising a housing configured to define an inlet port, an outlet port, and a throughbore linking the inlet port to the outlet port. A chamber having a spherical inner profile is positioned in the throughbore. A cam element positioned on a floor of the chamber. A ball is positioned in the chamber, and is configured to be rotatable in the chamber from a fully open condition to a closed condition sealing off fluid flow through the throughbore, the ball having a left arm and a right arm and a slot between each arm, wherein a terminal portion of each arm is positioned adjacent the cam element so that the cam element is positioned in the slot. The cam element is shaped so that, when the ball is rotated from the open condition to the closed condition, the cam element forces the arms apart to seal the throughbore.

In this facet of the invention, the cam element is further shaped to include a hollowed out portion with a wall acting as a cantilevered section that is in contact with the arms as the ball rotates. This feature allows the cam element wall to bend inwardly under force from the arms, and provides the ball valve with greater ability to cope with salt and sediment that may be deposited on the ball, in the valve throughbore and chamber. In a preferred aspect, the cantilevered section has an aspect ratio of more than three, and further preferred, the cantilevered section has a length of more than three millimeters. In another aspect, the cantilevered section has at least one discontinuity along the perimeter of the cam element. This provides even greater flexibility to the interface between the arms and the cam element.

These and other advantages of the invention will become apparent when read in light of the drawings, and the detailed description of the preferred embodiments.

BRIEF DESCRIPTION OF THE DRAWINGS

FIG. 4a is a sectional view of the ball valve of FIGS. 1 and 2, taken substantially along the line 4-4 in FIG. 2, shown in a first condition.

FIG. 4b is a sectional view of the ball valve of FIGS. 1 and 2, taken substantially along the line 4-4 in FIG. 2, shown in a second condition.

DETAILED DESCRIPTION OF THE PREFERRED EMBODIMENTS

Figure 1:
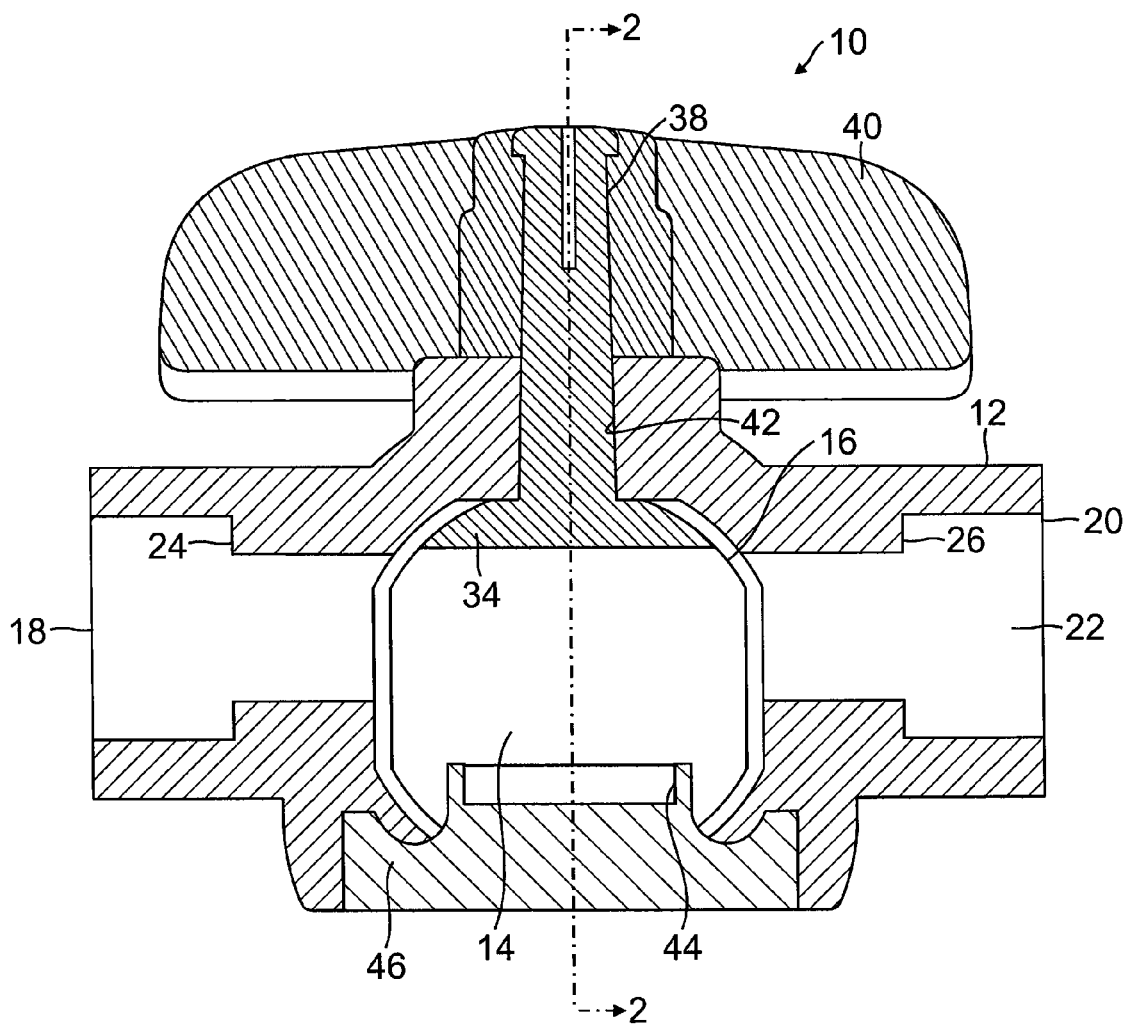
FIG. 1 is a sectional view of a ball valve having features of the present invention.
Figure 2:
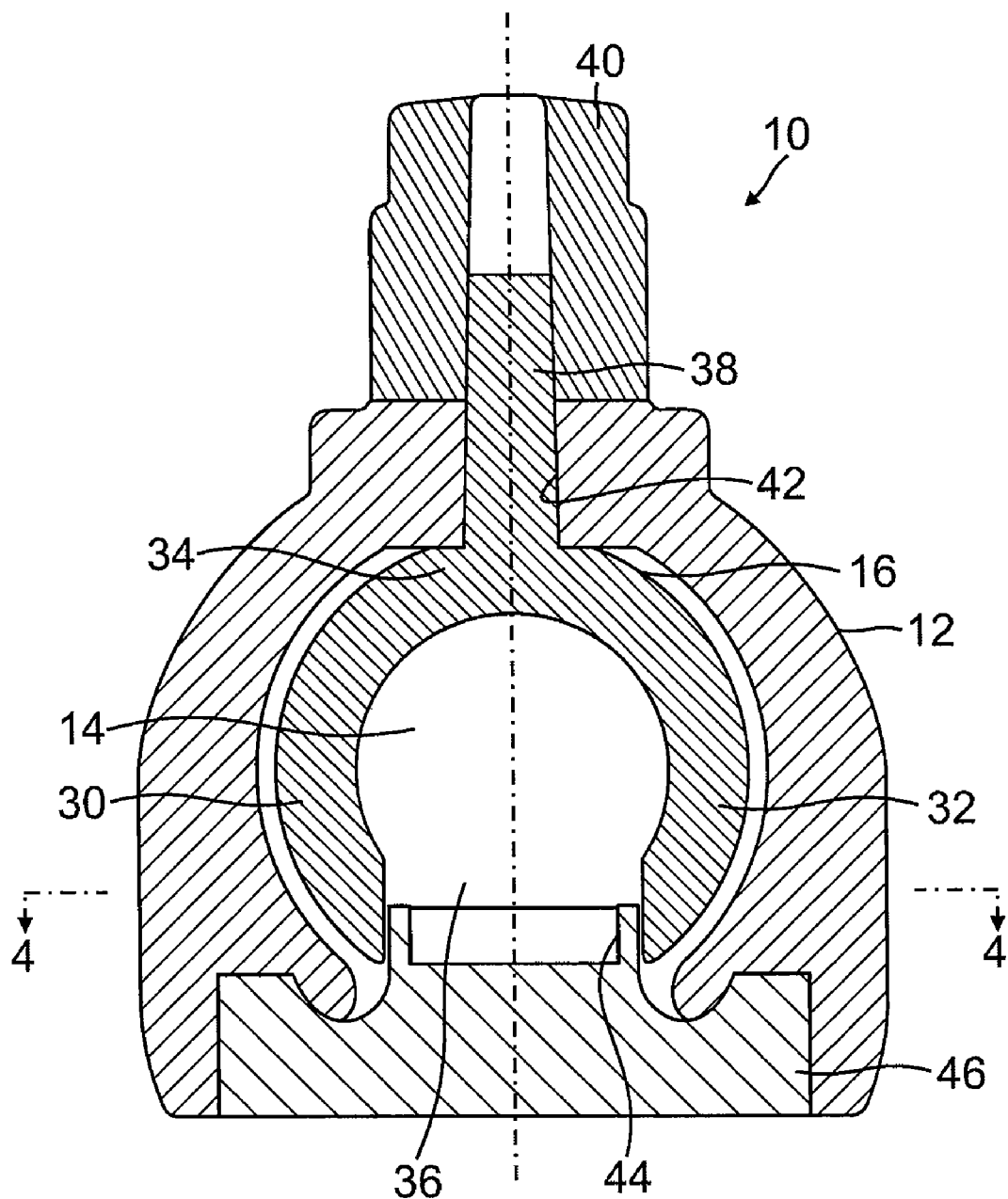
FIG. 2 is a sectional view of the ball valve of FIG. 1, taken substantially along the line 2-2 in FIG. 1.

With reference to the drawings, which are provided for exemplification and not limitation, there is described a ball valve having features of the present invention. With reference to FIGS. 1 and 2 of the drawings, a ball valve 10 is shown having a valve housing 12. The housing 12 defines a central chamber 14 configured to have an inner profile that is spherical to receive a rotatable ball 16 as will be described. Rotatable ball 16 is preferably made of a suitable resilient material, such as Acetal. The remaining components of the invention may be of any suitable material. In various embodiments, the components may be made from Acetal, acrylonitrile butadaiene styrene (ABS), polyvinyl chloride (PVC), or chlorinated polyvinyl chloride (CPVC).

The housing 12 further defines an inlet port 18 and an outlet port 20. A throughbore 22 extends between the inlet port and the outlet port, and passes through the chamber 14 to provide a passageway for fluid to flow through the valve 10. At external extremities of the throughbore, adjacent the inlet port 18 and adjacent the outlet port 20, the throughbore preferably has a first diameter. The diameter of the throughbore is preferably reduced at steps 24, 26 to a second diameter, smaller than the first diameter. Thus, as seen in FIG. 1, a first step 24 is situated between the inlet port 18 and the chamber 14, and a second step 26 is situated between the outlet port 20 and the chamber 14. Each of the two resulting lengths of the throughbore that have a first diameter is configured to be suitable for receiving an inlet conduit (not shown) and an outlet conduit (not shown) respectively. The first diameter may be smooth, or it may be threaded, depending on the type of conduit to be received.

A rotatable ball 16 is provided, and is mounted internal to the housing 12 in the central chamber 14. As best seen in FIG. 2, the ball includes a pair of side arms 30, 32, which are rounded and, in combination, follow the outer profile of a sphere. Arms 30, 32 are interconnected at the top by a web 34. A vertical slot 36 separates the arms as best seen in FIG. 2. A valve stem 38 is connected to the web 34 and extends upwardly. The valve body 12 has a central apertured opening 42 on the upper surface through which the stem 38 extends. A snap-on handle 40 is connected to the valve stem and is configured to cause the stem and the ball 16 to turn. A resilient O-ring (not shown) may be disposed in the valve body 12 between the aperture and the stem to sustain pressure within the chamber 14. The chamber 14 is sealed by a lower floor 46 that closes the chamber. The lower floor may be installed after the ball 16 is installed in the chamber, and fused to the housing 12 by conventional means, as exemplified in FIGS. 1 and 2.

In one aspect of the present invention, a cam element 44 is provided inside the valve body 12. The cam element 44 (see FIGS. 1 and 2) is preferably mounted on the lower floor 46 of the center chamber, and is positioned to be disposed between the side arms 30, 32. Preferably, the cam element is formed integrally with the lower floor 46 of the center chamber.

Figure 3B:
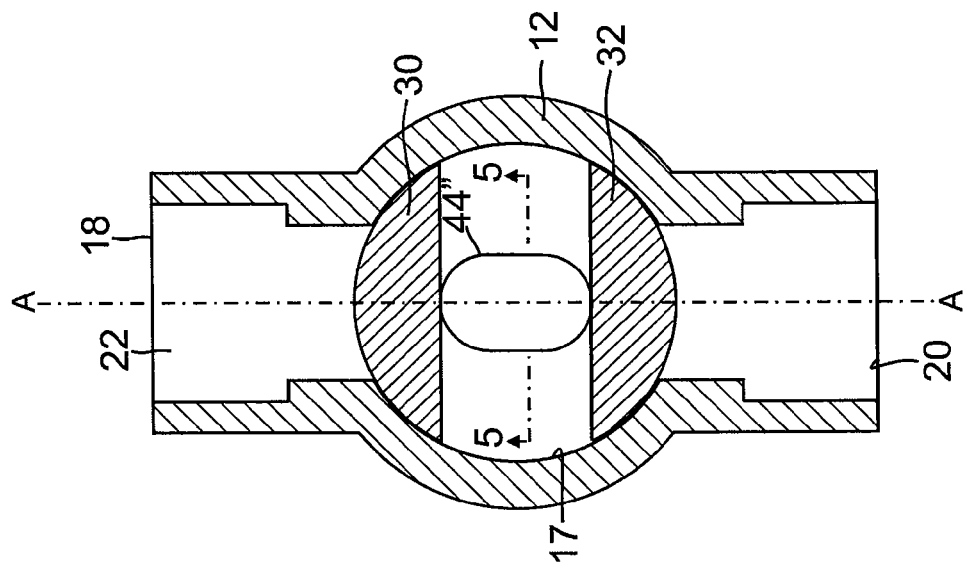
FIG. 3b, is a sectional view of components of a ball valve known in the prior art, shown in a second condition.
Figure 3A:
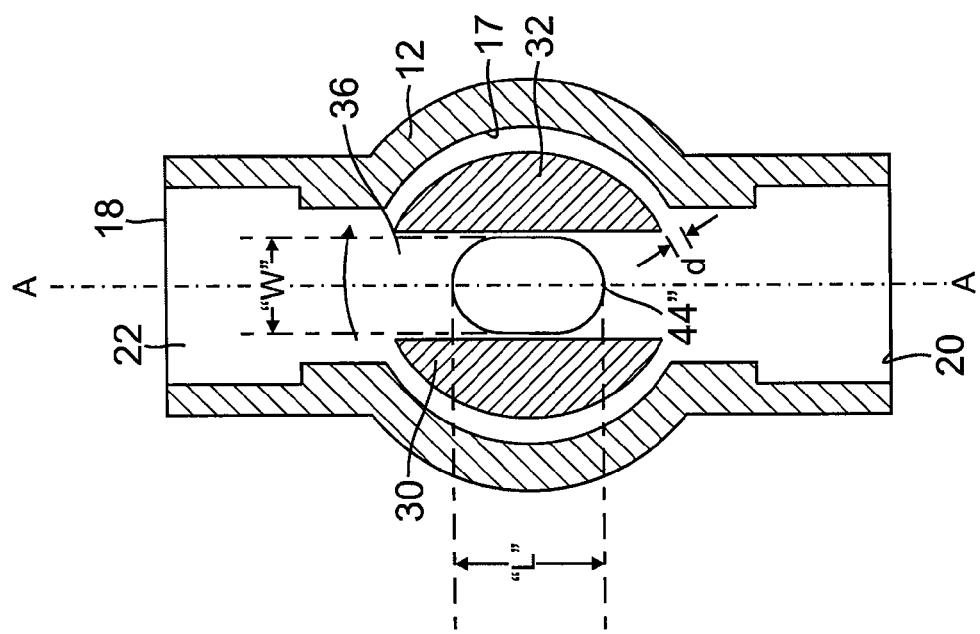
FIG. 3a is a sectional view of components of a ball valve known in the prior art, shown in a first condition.
Figure 5:
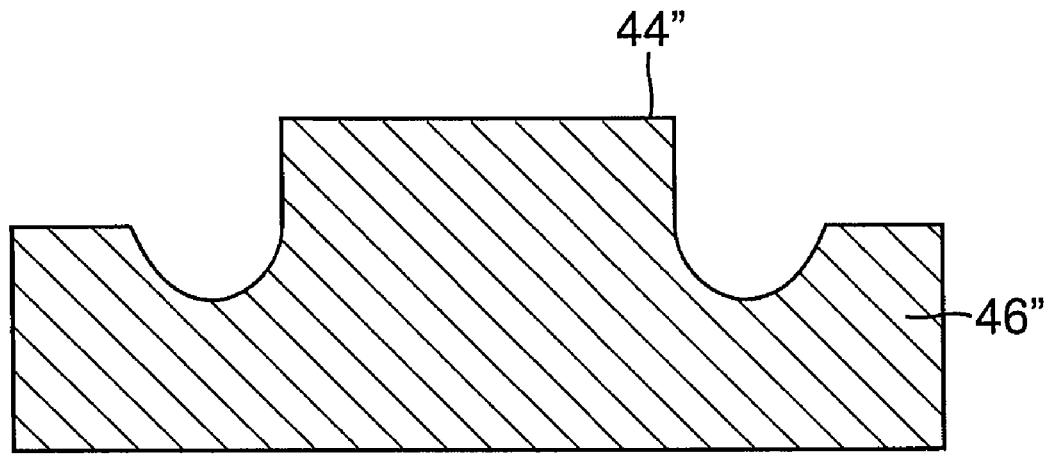
FIG. 5 is a section through a ball valve camming means known in the prior art, taken substantially along line 5-5 in FIG. 3b.
Figure 7:
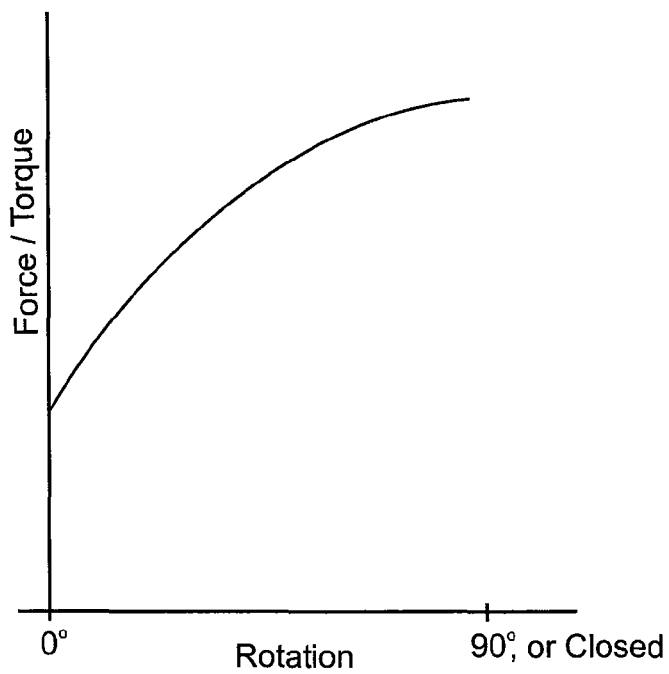
FIG. 7 is a graph plotting the force, or torque (on the vertical axis) required to turn the handle of a ball valve typical in the prior art, by a certain angle (on the horizontal axis).

At this point, a description here of the prior art will serve to allow subsequent clarification of the novel features of the invention. As to the shape and structure of a camming means known in the prior art, this is exemplified in FIGS. 3a, 3b and 5, where a reference numeral is given a "double prime" to indicate a structure in the prior art that is different from the structure of the present invention. The camming means 44", as seen in FIGS. 3a, 3b and 5, is known to have a solid oval shape when viewed from above and in cross-section in FIG. 5. The oval shape is symmetrical about its elongate axis, and may comprise two straight parallel sides connected at the ends by two semicircles, so that the oval has a length "L" and a width "W" that is smaller than the length. The elongate axis of the camming means 44" is parallel with the axis A-A of the throughbore. Furthermore, the camming means 44" of the prior art is a solid protrusion from the floor of the valve, as exemplified in FIG. 5. A lower portion of each side arm 30, 32 rests adjacent the camming means 44", so that, when the ball is rotated to an "open" condition, as seen in FIG. 3a, it is configured to permit water to flow through the throughbore 22. In the open condition, the handle 40 is rotated so that the slot 36 in the ball 16 is aligned with the throughbore 22 of the housing 12. Thus, a clear uninterrupted bore extends through the ball valve and fluid may flow between inlet port 18 and outlet port 20. In this open condition the side arms are positioned adjacent the camming means at the narrower dimension "W" of the camming means, as seen in FIG. 3a, and the outside surface of the side arms 30, 32 are configured to not be in hard contact with the inner surface 17 of the inner chamber 14. Rather, in this condition (FIG. 3a), a small space "d" is to be found between the outer surface of the arms and the inner surface of the chamber. In moving the ball valve to a "closed" condition, which is exemplified in FIG. 3b, the handle is rotated (preferably by about 90 degrees) so that the slot 36 in the ball 16 extends perpendicular to the throughbore 22 to interrupt the throughbore. Moreover, in the process, the lower portion of each side arm is forced to follow the outline of the camming means 44." Because the camming means is longer than it is wide, rotating the handle will force the arms 30, 32 to bend outwardly and apart from each other as they follow the longer dimension "L" of the camming means, as seen in FIG. 3b. This action eliminates the space "d" between the outer surface of the arms 30, 32, and the inner surface 17 of the chamber, thereby tightening the seal between the ball and the inner surface of the chamber, and completely interrupting the flow of fluid through the throughbore 22. Because the distance between the arms 30, 32 increases steadily when the ball is moved from the open condition to the closed condition, the force or torque required to keep the arms open also increases steadily as the ball is moved from the open condition to the closed condition, as schematically shown in FIG. 7.

Figure 4C:
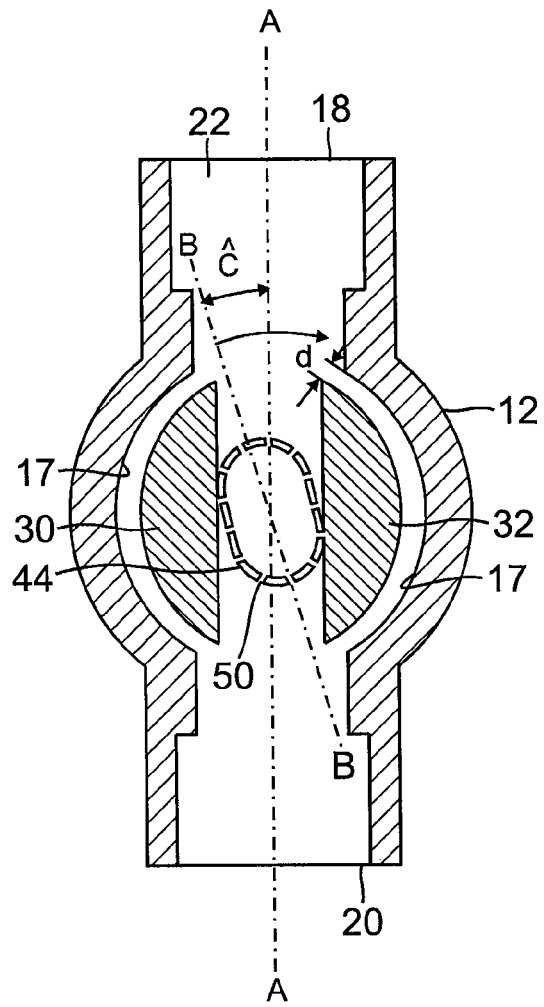
FIG. 4c is a variation of the embodiment shown in FIGS. 4a and 4b.

Turning now to novel features of the present invention, these are described with reference to FIGS. 4a, 4b and 6. Here, a cam element 44 of the present invention preferably has an elongate axis of symmetry B-B that is not parallel with the axis A-A of the throughbore, but is offset from the axis by a few degrees (the angle C), as seen in FIGS. 4a and 4b. In a preferred embodiment, the offset is between about 15 and 30 degrees. In another preferred embodiment, the offset is about 15 degrees.

Figure 8:
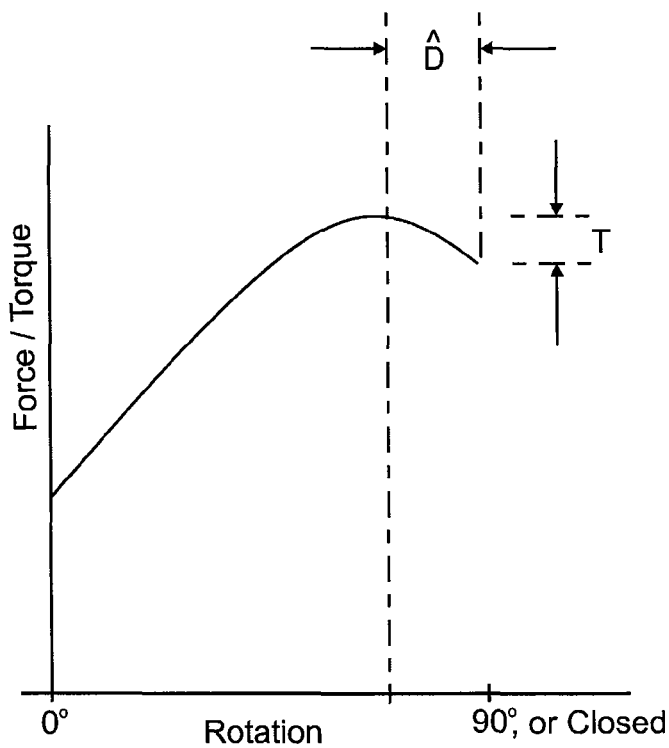
FIG. 8 is a graph plotting the force, or torque (on the vertical axis) required to turn the handle of the ball valve of the present invention by a certain angle (on the horizontal axis).

In moving the ball valve from an "open" condition, exemplified in FIG. 4a, to a "closed" condition exemplified in FIG. 4b, the handle is rotated so that the slot 36 in the ball 16 extends perpendicularly across the throughbore 22 to interrupt the throughbore. However, one aspect of the invention which distinguishes it over the prior art is that, due to the angular offset of the longitudinal axis B-B of the cam element 44 from the longitudinal axis A-A of the throughbore 22, the distance, and thus the force, separating the side arms reduces slightly over the final few degrees of rotation of the ball, as may be understood with reference to FIG. 8 which shows the relationship between turning force (or torque) applied to the ball, and the angle of rotation of the ball 16. It is seen in FIG. 8 that, over the final few degrees of rotation (the angle D) before the ball reaches the fully closed condition, the amount of force (or torque) required to bring the ball to the closed condition reduces by an amount "T" from the maximum. Thus, the maximum force or torque required to turn the ball occurs at an angle of rotation that is "D" degrees (as indicated in FIG. 8) short of the closed condition.

Figure 4D:
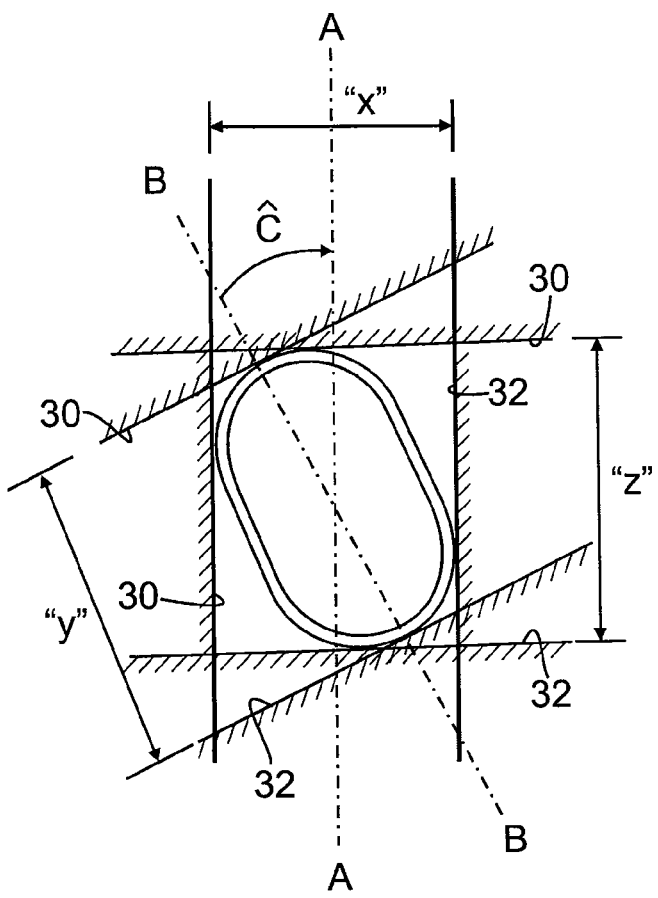
FIG. 4d is a detail view of an aspect of the view of FIG. 4b, exemplifying a certain aspect of the invention.

Another way of stating the foregoing is that, the cam element 44 is shaped so that, when the ball is rotated from the open condition to the closed condition, the cam element forces the arms through three distances of separation from each other. This is best understood with reference to FIG. 4d. There is a first distance of separation "x" in which the arms are spaced a first distance from each other, when the ball has undergone no rotation from the fully open condition. There is a second distance of separation "y" in which the arms are spaced a second distance from each other, when the ball has undergone some rotation from the fully open condition towards the closed condition but has not reached the closed condition. And there is a third distance of separation "z" in which the arms are spaced a third distance from each other, and in which the ball has undergone rotation to the closed condition. In the described configuration of the invention, the third distance "z" is greater than the first distance "x", and the second distance "y" is greater than the third distance "z". This may be more clearly seen with reference to FIG. 4d. Preferably, the difference between the second distance, at its maximum extent, and the third distance is not less than about 15% of the difference between the second distance and the first distance. In a preferred embodiment, the valve is configured so that the maximum extent of the second distance "y" occurs at an angle of rotation D degrees (as seen in FIG. 8) short of the closed condition. Further preferred, the valve is configured so that angle D is in a range of between about 10 degrees and 20 degrees, most preferably about 15 degrees.

The corollary of the foregoing fact is that, when the ball 16 is rotated from the closed position back towards the open position, the first few degrees of rotation from the closed position will encounter an increasing force of turning, as may be understood with reference to FIG. 8. The first few degrees of rotation will not steadily reduce from the very first degree of rotation, as exists in the prior art that is reflected in FIG. 7. The described feature of the cam element 44 of the present invention provides an advantageous improvement over the prior art because the invention effectively provides a "lock" on the ball 16 when it is in the closed position. Any tendency of the water pressure in the conduit (possibly assisted by vibration applied to the valve 10) to cause the ball 16 to rotate towards the open position, is opposed by a resistant force ("T", as represented in FIG. 8) that must first be overcome in the first few degrees (angle "D," as represented in FIG. 8) of rotation of the ball. In a preferred embodiment, the angle D is between 15 degrees and 30 degrees. This corresponds with structure wherein the second distance "y" reaches a maximum extent 15 degrees to 30 degrees of rotation away from the closed condition, when the distance of separation is the third distance, "z". Furthermore, any accidental bumping force against the handle when in the closed condition, that would in the prior art meet with an ever decreasing resistance, will, under the principles of the present invention, meet with a force that increases for a few degrees of rotation, and will tend to terminate any accidental movement of the handle. Rather, a deliberate effort to move the handle from the closed to the open condition will be required of the ball valve of the present invention, and likelihood of an accidental openings will be reduced. While a preferred cam shape of the invention is described as being a symmetrical shape that has a line of symmetry offset from the axis of the valve, the same effect can be achieved with other shapes which produce the described novel effect.

Figure 6:
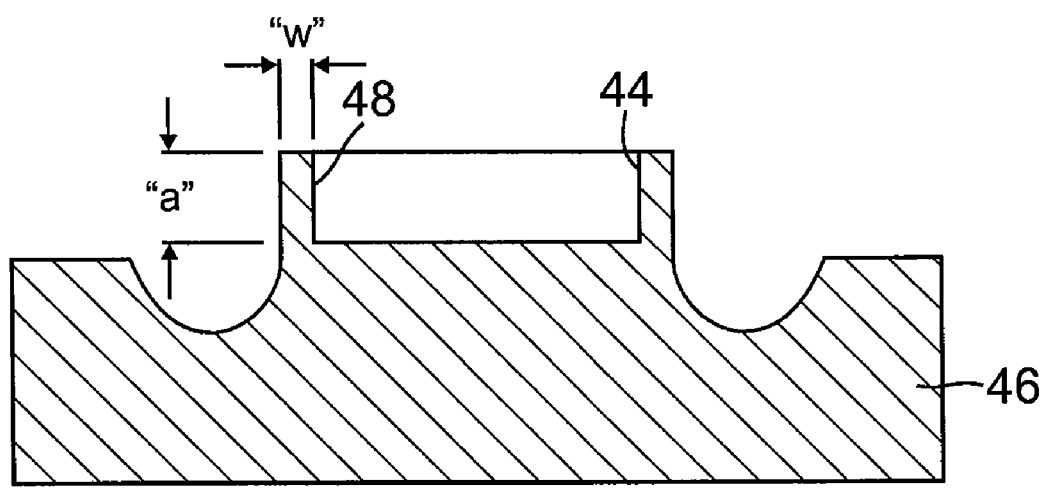
FIG. 6 is a section through the cam element of the ball valve of FIG. 4b, taken substantially along line 6-6.

In yet another aspect of the invention, as exemplified in FIGS. 1, 2, and 6 the cam element 44 of the invention is configured to possess a degree of bending flexibility when in contact with the arms 30, 32. To achieve this result, the cam element 44 is formed to have a hollowed out portion with a cross-section that provides a relatively flexible upwardly extending cantilever portion 48 (FIG. 6) that also extends laterally along the perimeter of the cam element 44. This cantilevered portion 48 provides a flexible outer wall having the perimeter shape described. Thus, when the side arms 30, 32 are rotated around the outside perimeter of the cam element, the force exerted by the side arms onto the cantilever portions of the cam element 44 may cause the cantilever portion or wall 48 to bend slightly inwardly toward the center of the cam element 44. This additional flexibility between the arms and the cam element provides an advantageous result, namely, any tendency for salt or sediment deposit between the side arms 30, 32 and the cam element 44 to stop the ball from rotating may be overcome to some extent in that the cam element 44 may bend out of the way.

In preferred embodiments, and based on empirical observations, the cantilevered section has an aspect ratio of more than three, where the aspect ratio is the ratio of the length "a" of the cantilever portion 48 divided by the width "w" (i.e., the wall thickness) of the cantilever as indicated in FIG. 6. Further preferred, the cantilevered portion 48 has a length "a" of more than three millimeters for gardening and landscape pipes and water pressures. For the present preferred embodiment, operating conditions typically include pressure rated to 100 psi at 180° F. In one preferred embodiment, the length a is about 6 mm, and the width w is about 2 mm. The wall thickness and related aspect ratio are relevant considerations, because if the wall is too thick, the ball may be too difficult to turn. This is a negative for the consumer. If the wall is too thin, there may be too much flexing in the wall under water pressure so the ball might not properly seal against the inlet port to fully shut off water flow.

In yet a further preferred aspect, the cam element 44 may have at least one discontinuity 50 (but preferably eight in number, to provide greater flexibility combined with sufficient strength) along the perimeter of the cam element, at which discontinuity there is effectively no portion of the cam element that protrudes upwardly from the floor 46. This aspect is exemplified in FIG. 4*c*. A discontinuity may be understood as a slot in the perimeter of the cam element. The cam element 44 of FIG. 4*c* with its discontinuities possesses a cantilever portion that is more flexible than the embodiment exemplified in FIG. 4*b*. This aspect will enable the designer to more exactly fabricate a cam element having an advantageously desired bending flexibility.

Thus, the present invention addresses with novel and useful features certain needs that are found in the art. The present invention may, of course, be carried out in other specific ways than those herein set forth without departing from the essential characteristics of the invention. The present embodiments are, therefore, to be considered in all respects as illustrative and not restrictive, while the scope of the invention is set forth in the claims that follow.

What is claimed is:

1. A ball valve for controlling fluid flow, comprising:
a housing configured to define
an inlet port,
an outlet port,
a throughbore linking the inlet port to the outlet port, and
a chamber having a spherical inner profile positioned in the throughbore;
a cam element positioned on a floor of the chamber, wherein the cam element includes an oval shape with a hollow portion that introduces flexibility to the oval shape;
a ball positioned in the chamber, and configured to be rotatable in the chamber from a fully open condition to a closed condition sealing off fluid flow through the throughbore, the ball having a left arm and a right arm and a slot between each arm, wherein a terminal portion of each arm is positioned adjacent the cam element so that the cam element is positioned in the slot;
wherein the cam element is shaped so that, when the ball is rotated from the open condition to the closed condition, the cam element forces the arms through three distances of separation from each other,
a first distance of separation in which the arms are spaced a first distance from each other, when the ball has undergone no rotation from the fully open condition;
a second distance of separation in which the arms are spaced a second distance from each other, when the ball has undergone some rotation from the fully open condition towards the closed condition but has not reached the closed condition;
a third distance of separation in which the arms are spaced a third distance from each other, and in which the ball has undergone rotation to the closed condition;
wherein, the third distance is greater than the first distance, and the second distance is greater than the third distance.

2. The ball valve of claim 1, wherein the cam element has a shape that is symmetrical about a line which is offset from an axis linking the inlet port with the outlet port.

3. The ball valve of claim 2, wherein the offset is an angle of between about 15 and 30 degrees.

4. The ball valve of claim 1, wherein the difference between the second distance and the third distance is not less than about 15% of the difference between the second distance and the first distance.

5. The ball valve of claim 1, wherein the second distance reaches a maximum extent when the ball is rotated to a range of between about 10 degrees and 20 degrees from the closed condition.

6. A ball valve for controlling fluid flow, comprising:
a housing configured to define
an inlet port,
an outlet port,
a throughbore linking the inlet port to the outlet port, and
a chamber having a spherical inner profile positioned in the throughbore;
a cam element positioned on a floor of the chamber;
a ball positioned in the chamber, and configured to be rotatable in the chamber from a fully open condition to a closed condition sealing off fluid flow through the throughbore, the ball having a left arm and a right arm and a slot between each arm, wherein a terminal portion of each arm is positioned adjacent the cam element so that the cam element is positioned in the slot;
wherein, the cam element is shaped so that, when the ball is rotated from the open condition to the closed condition, the cam element forces the arms apart to seal the throughbore, the cam element being further shaped to include hollowed out portion with a cantilevered section that is in contact with the arms as the ball rotates.

7. The ball valve of claim 6, wherein the cantilevered section has an aspect ratio of more than three.

8. The ball valve of claim 6, wherein the cantilevered section has a length of more than three millimeters.

9. The ball valve of claim 6, wherein the cantilevered section has at least one discontinuity along the perimeter of the cam element.

10. The ball valve of claim 9, wherein the at least one discontinuity is eight discontinuities in number.

11. A ball valve for controlling fluid flow, comprising:
a housing configured to define
an inlet port,
an outlet port,
a throughbore linking the inlet port to the outlet port, and
a chamber having a spherical inner profile positioned in the throughbore;
a cam element positioned on a floor of the chamber, wherein the cam element includes an oval shape with a hollow portion that introduces flexibility to the oval shape;
a ball positioned in the chamber, and configured to be rotatable in the chamber from a fully open condition to a closed condition sealing off fluid flow through the throughbore, the ball having a left arm and a right arm and a slot between each arm, wherein a terminal portion of each arm is positioned adjacent the cam element so that the cam element is positioned in the slot;
wherein the cam element is shaped so that, when the ball is rotated from the open condition to the closed condition, the cam element forces the arms through three distances of separation from each other,
a first distance of separation in which the arms are spaced a first distance from each other, when the ball has undergone no rotation from the fully open condition;
a second distance of separation in which the arms are spaced a second distance from each other, when the ball has undergone some rotation from the fully open condition towards the closed condition but has not reached the closed condition;

a third distance of separation in which the arms are spaced a third distance from each other, and in which the ball has undergone rotation to the closed condition;

wherein, the third distance is greater than the first distance, and the second distance is greater than the third distance; and further wherein the cam element is further shaped to include a cantilevered section which is in contact with the arms as the ball rotates.

12. The ball valve of claim 11, wherein the cantilevered section includes an oval shaped perimeter wall that is flexible to accommodate sediment thereon and not jam, yet rigid enough to support the ball to fully seal off fluid flow from the inlet port.

13. The ball valve of claim 11, wherein the cam element has a shape that is symmetrical about a line which is offset from an axis linking the inlet port with the outlet port.

14. The ball valve of claim 13, wherein the offset is an angle of between about 15 and 30 degrees.

15. The ball valve of claim 11, wherein the difference between the second distance and the third distance is not less than about 15% of the difference between the second distance and the first distance.

16. The ball valve of claim 11, wherein the second distance reaches a maximum extent when the ball is rotated to a range of between about 10 and 20 degrees from the closed condition.

17. The ball valve of claim 11, wherein the cantilevered section has an aspect ratio of more than three.

18. The ball valve of claim 11, wherein the cantilevered section has a length of more than about three millimeters.

19. The ball valve of claim 11, wherein the cantilevered section includes at least one discontinuity along the perimeter of the cam element.

\* \* \* \* \*